United States Patent
Kroeger et al.

[11] Patent Number: 5,828,705
[45] Date of Patent: Oct. 27, 1998

[54] CARRIER TRACKING TECHNIQUE AND APPARATUS HAVING AUTOMATIC FLYWHEEL/TRACKING/REACQUISITION CONTROL AND EXTENDED SIGNAL TO NOISE RATIO

[76] Inventors: Brian W. Kroeger, 12813 Amberwoods Way, Sykesville, Md. 21784; Jeffrey S. Baird, 10882 Olde Woods Way, Columbia, Md. 21044

[21] Appl. No.: 593,154
[22] Filed: Feb. 1, 1996
[51] Int. Cl.[6] ............ H04L 27/14; H04L 27/16; H04L 27/22
[52] U.S. Cl. ............ 375/326; 375/326; 375/354; 375/355; 375/324; 375/316; 375/322
[58] Field of Search .............. 375/326, 355, 375/354

[56] References Cited

U.S. PATENT DOCUMENTS

| | | | |
|---|---|---|---|
| 4,785,463 | 11/1988 | Janc et al. | 375/206 |
| 5,541,965 | 7/1996 | Daffara | 375/326 |
| 5,566,214 | 10/1996 | Kroeger et al. | 375/355 |
| 5,579,345 | 11/1996 | Kroeger et al. | 375/344 |
| 5,644,606 | 7/1997 | Martinez et al. | 375/376 |
| 5,684,842 | 11/1997 | Daffara | 375/354 |
| 5,696,797 | 12/1997 | Bucher et al. | 375/344 |
| 5,699,385 | 12/1997 | D'Sylva et al. | 375/344 |

*Primary Examiner*—Stephen Chin
*Assistant Examiner*—Michael Maddox
*Attorney, Agent, or Firm*—R. P. Lenart

[57] ABSTRACT

The carrier tracking loop technique and apparatus provides smooth, accurate frequency tracking, fast reacquisition and doppler tracking over a wide dynamic range. The loop parameters of the carrier tracking loop are varied as a function of mode, i.e. flywheel, tracking or reacquisition modes. The various modes of operation are automatically detected and loop operation is enhanced by non-linear techniques. The enhancements include fourth power sample normalization to improve performance over a large dynamic range and to ease fixed point scaling. A slope limiter is included which aids in coherent detection by reducing phase noise introduced by the carrier tracking loop. Also, a predifferentiation filter further aids in coherent detection by reducing phase noise.

27 Claims, 5 Drawing Sheets

CARRIER TRACKING TECHNIQUE AND APPARATUS HAVING AUTOMATIC FLYWHEEL/TRACKING/REACQUISITION CONTROL AND EXTENDED SIGNAL TO NOISE RATIO

CROSS REFERENCE TO RELATED APPLICATIONS

This application is related to U.S. Pat. No. 5,579,345 by Brian W. Kroeger, Jeffrey S. Baird and Joseph B. Bronder entitled "Carrier Tracking Loop for QPSK Demodulator"; U.S. Pat. No. 5,768,323 by Brian W. Kroeger, Joseph B. Bronder, Todd A. Oblak and Jeffrey S. Baird entitled "Symbol Synchronizer Using Modified Early/Punctual/Late Gate Technique" and U.S. Pat. No. 5,566,214 by Brian W. Kroeger and Jeffrey S. Baird entitled "Automatic Noise Normalization and Reacquisition Control for a QPSK Demodulator Symbol Tracking Loop", which are all incorporated herein by reference.

BACKGROUND OF THE INVENTION

1. Field of the Invention

The present invention relates to an improved carrier tracking technique and apparatus intended for use with a QPSK or π/4QPSK demodulator and providing enhanced performance including smooth accurate frequency tracking, fast reacquisition and doppler tracking over a wide dynamic range.

2. Description of the Background Art

The purpose of a carrier tracking loop is to minimize the carrier frequency offset error in a digital receiver after a QPSK (quadrature phase shift keying) or π/4QPSK modulated signal has been translated from an RF or IF frequency to near baseband. The residual frequency offset error may be due to any of several sources including doppler, inaccurate local oscillators at either the transmitter end or receiver end, or intentional offset included to eliminate the effects of DC offset due to inadvertent carrier leakage in a receiver front end.

Frequency tracking can be used with either coherent, partially coherent or differential QPSK detection. A frequency-locked loop (FLL) instead of a phase-locked loop (PLL) is preferred since the phase estimation is performed separately in the detection process. Another advantage of a frequency locked loop over a phase-locked loop is that the frequency locked loop has a wider capture range than the phase-locked loop.

SUMMARY OF THE INVENTION

An object of the present invention is to provide an improved carrier tracking technique and apparatus, intended for use with a π/4QPSK or QPSK demodulator in a preferred embodiment, which meets conflicting requirements of smooth, accurate frequency tracking, fast reacquisition and doppler tracking over a wide dynamic range which are not generally achievable with conventional carrier tracking techniques and apparatus.

A further object of the present invention is to provide a carrier tracking loop technique and apparatus having improved automatic flywheel/tracking/reacquisition mode detection and control.

A still further object of the present invention is to provide an improved carrier tracking loop technique and apparatus having normalized signal processing for well-behaved closed loop operation over a very large dynamic range of input signal.

An additional further object of the present invention is to provide an improved carrier tracking loop technique and apparatus having SNR (signal to noise ratio) estimation and error signal processing which allows the carrier tracking loop to flywheel when signal fading occurs, such as in a mobile communications application for example.

A yet further object of the present invention is to provide an improved carrier tracking loop technique and apparatus which implements low pass filtering of fourth-power samples before differentiation extends tracking performance down below 3 db Eb/No with sufficient gain to handle doppler variation (about 1% of symbol rate).

An additional further object of the present invention is to provide an improved carrier tracking loop technique and apparatus having slope limiting of the carrier tracking loop error signal for reducing phase noise introduced by the carrier tracking loop while retaining fast reacquisition response times.

The above-noted and other objects of the present invention are fulfilled by providing a carrier tracking loop having a mixer for mixing a received signal with a local oscillator signal to translate the received signal to a near baseband signal; an oscillator for generating the local oscillator signal in accordance with an error signal; a symbol synchronizer for sampling the near baseband signal at an optimum symbol timing and for outputting symbol samples; and loop control processing for generating the error signal in accordance with the symbol samples, determining a signal to noise ratio of the symbol samples and adjusting a gain of the carrier tracking loop in accordance with the determined signal to noise ratio. In a preferred embodiment, the loop control may include a slope limiter for limiting a slope of the error signal.

The above-noted and other objects of the present invention can also be fulfilled by a method of tracking a carrier signal in a carrier tracking loop including a) generating a local oscillator signal in accordance with an error signal; b) mixing a received signal with the local oscillator signal to translate the received signal to a near baseband signal; c) sampling the near baseband signal at an optimum symbol timing to provide symbol samples; d) generating the error signal in accordance with the symbol samples; e) determining a signal to noise ratio of the symbol samples; and f) adjusting a gain of the carrier tracking loop in accordance with the determined signal to noise ratio. The method of tracking a carrier signal may further include limiting a slope of the error signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DESCRIPTION OF THE PREFERRED EMBODIMENTS

Figure 1:
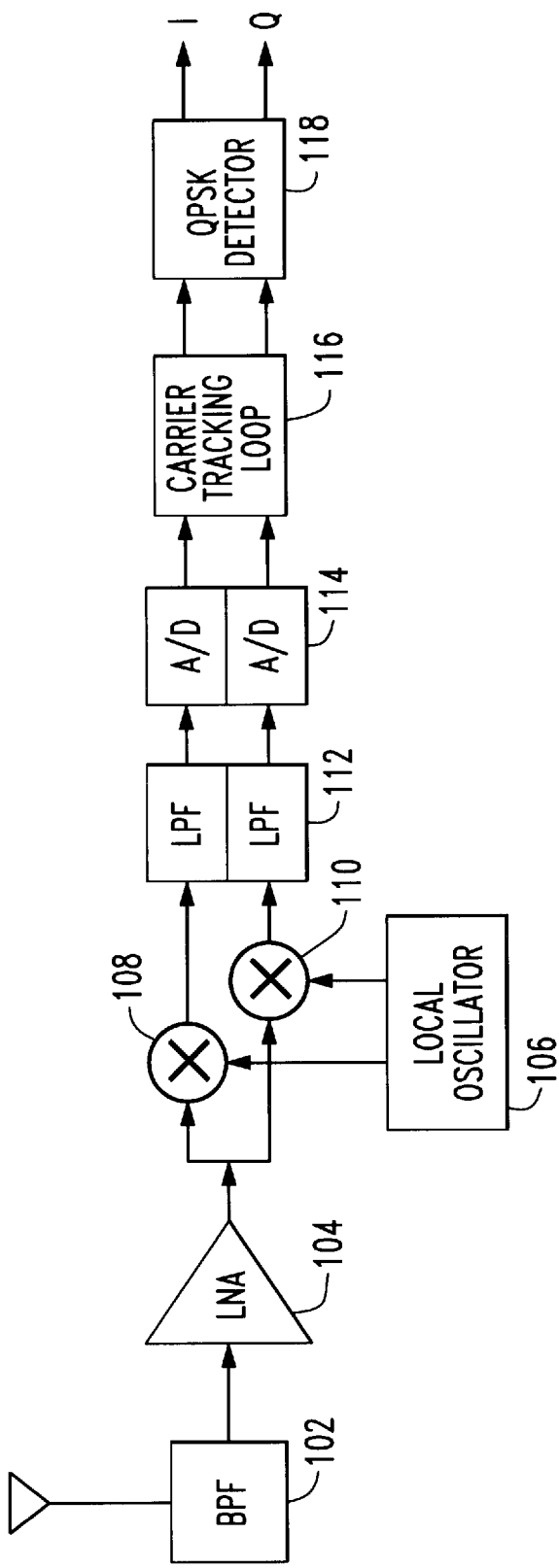
FIG. 1 illustrates a simplified block diagram of a direct conversion receiver including a QPSK demodulator.

A block diagram of a direct conversion receiver including a QPSK demodulator is illustrated in FIG. 1. The received signal is respectively filtered and amplified by bandpass filter 102 and low noise amplifier 104 and subsequently provided to mixers 108 and 110. Local oscillator 106 is approximately tuned to the complex conjugate of the carrier frequency of the received signal. The local oscillator signals are used to translate or multiply the received signal to a baseband or near baseband data waveform consisting of complex pulses having complex real and imaginary polarities which represent the data stream. These in-phase and quadrature signal components are subsequently filtered and digitally converted in low-pass filters 112 and A/D converters 114, respectively. Digital samples of the baseband in-phase and quadrature signal components are provided to carrier tracking loop 116. Carrier tracking loop 116 attempts to minimize the frequency offset error. The corrected symbol samples are subsequently provided to QPSK detector 118.

Figure 2:
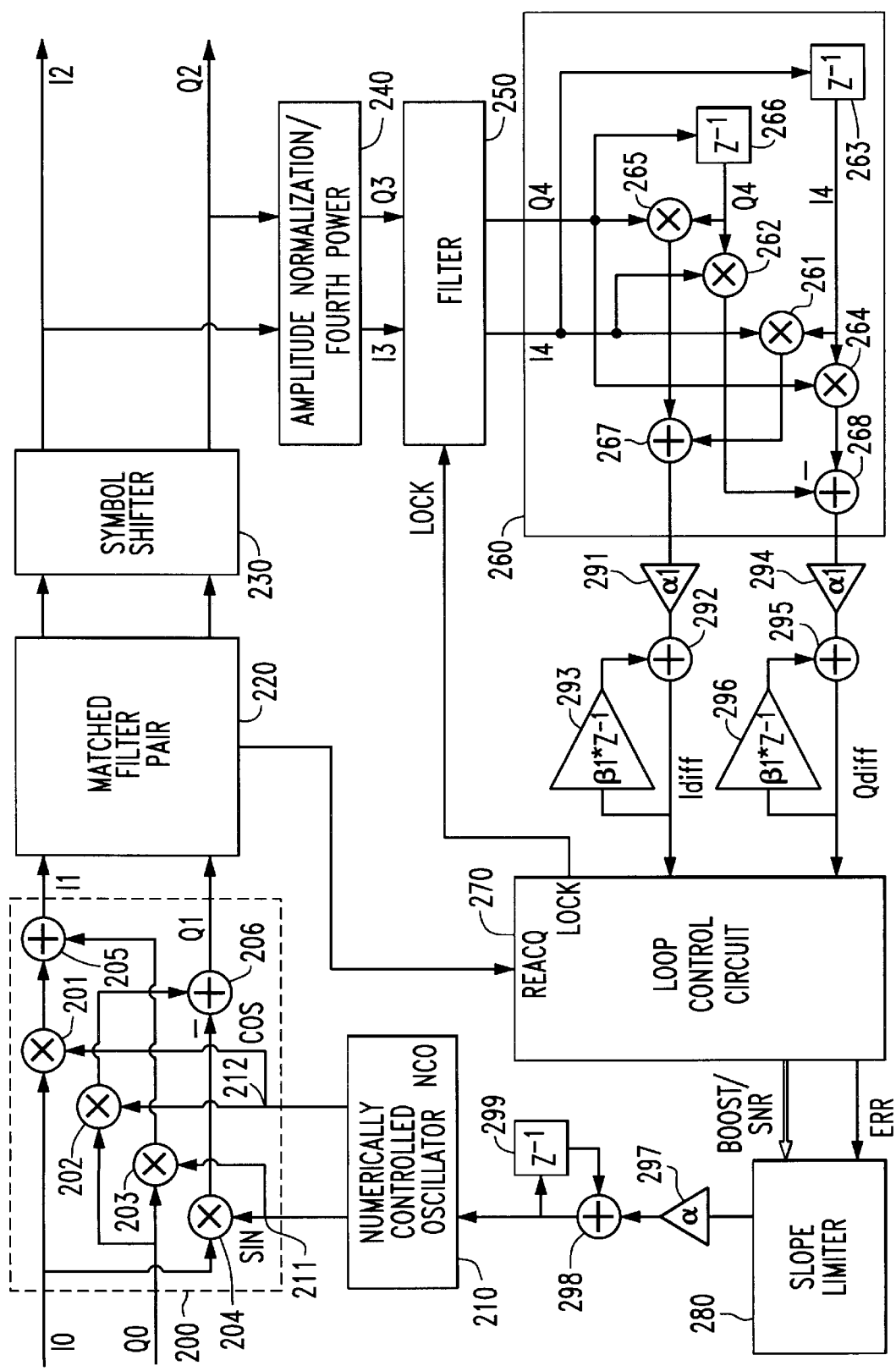
FIG. 2 illustrates a block diagram of a carrier tracking loop of a preferred embodiment of the present invention.

FIG. 2 illustrates a schematic block diagram of a demodulator carrier tracking loop according to an embodiment of the present invention. In a preferred embodiment, the carrier tracking loop may be part of a QPSK or π/4QPSK demodulator, but is understood not to be limited thereto. In general, the carrier tracking loop is a closed-loop servo mechanism which attempts to keep the frequency of numerically controlled oscillator 210 equal to the complex conjugate of the incoming offset-baseband carrier frequency through negative feedback.

The offset baseband in-phase I0 and quadrature Q0 signal components are input to complex multiplier 200 and may be represented as $$S_{input}(m) = A_m QPSK(m) e^{j(2\pi f_{off} m T_{sample} + \phi_m)} + \text{noise}_{input}(m) \quad (1).$$

The in-phase I0 signal component is provided as a first input to multipliers 201 and 204. The quadrature Q0 signal component is provided as a first input to multipliers 202 and 203.

Numerically controlled oscillator 210 outputs sine signal SIN 211 and cosine signal COS 212, which may be represented as $$S_{NCO}(m) = e^{j2\pi f_{NCO} m T_{sample}} = e^{-j2\pi (f_{off} + \Delta f) m T_{sample}} \quad (2).$$

An example of a numerically controlled oscillator is described in detail in copending application U.S. Pat. No. 5,579,345. It is to be understood that numerically controlled oscillator 210 is not limited to such a configuration and that equivalent oscillators as known to those skilled in the art may be used.

Sine signal SIN 211 is provided as a second input to multipliers 203 and 204 and cosine signal COS 212 is provided as a second input to multipliers 201 and 202. The outputs of multipliers 201 and 203 are added in adder 205 to provide a frequency corrected in-phase I1 signal component. The output of multiplier 204 is subtracted from the output of multiplier 202 in subtractor 206 to provide a frequency corrected quadrature Q1 signal component. In closed loop operation, the frequency perturbation term Δf is a zero mean random process. The in-phase I1 and quadrature Q1 signal components can be represented as $$S_{input}(m) S_{NCO}(m) = A_m QPSK(m) e^{j(2\pi \Delta f m T_{sample} + \phi_m)} + \text{noise}(m) \quad (3).$$

The in-phase I1 and quadrature Q1 signal components are output to matched filter pair 220 to be matched-filtered synchronously with the symbol timing. An example of a matched filter pair is disclosed in U.S. Pat. No. 5,579,345. It is to be understood however that matched filter pair 220 is not limited to the particular embodiment disclosed in the above-noted patent. Since the matched filter pair 220 is provided within the carrier tracking loop, out of band signals are filtered out allowing the loop to track without interference.

The output symbol samples provided from matched filter pair 220 have arbitrary phase offset and some smaller residual frequency perturbations (frequency tracking error), possibly due to acceleration or oscillator drift, which are not corrected by the carrier tracking loop. However, the carrier tracking loop should be designed with parameters α and β as subsequently described such that the residual frequency perturbations are sufficiently small to minimize adverse effects on subsequent detection. Performance of the carrier tracking loop is generally a compromise between frequency tracking response time and loop noise bandwidth with minimum overshoot and ringing. The arbitrary phase offset noted above which is stationary or slowly changing should be removed by the subsequent QPSK detection process, which is not illustrated in FIG. 2.

The input sample rate with index m is greater than the symbol rate with index n by a factor equal to the number of complex input samples representing each symbol. The symbol synchronous output samples of matched filter pair 220 can be represented as $$S_{MF}(n) = a_n e^{j(2\pi \Delta f n T_s + d_n \theta \pi/2 + \phi_n)} + \text{noise}_{MF}(n) \quad (4).$$

wherein $d_n$ may be 0, 1, 2 or 3 dependent upon the pair of information bits representing the nth QPSK symbol, $T_s$ represents the symbol period and $\phi_n$ represents the arbitrary phase offset.

The symbol synchronous output samples from matched filter pair 220 are provided to symbol shifter 230. It is to be understood that symbol shifter 230 is provided only for the case of π/4QPSK reception, and not for standard QPSK reception. Symbol shifter 230 removes the π/4 shift on alternate soft decision symbols from matched filter pair 220. The π/4 (45°) shift can be achieved by multiplication of alternate complex soft symbols output from matched filter pair 220 by the complex quantity (0.707-j0.707). The purpose of the π/4 shift at the transmitter side is to eliminate RF envelope transitions through zero amplitude. It is to be further understood that the symbol shifter 230 is not limited to the particular embodiment described and that the symbol shift can be provided by different means as would be evident to one of ordinary skill.

In the case of π/4QPSK reception, the output of symbol shifter 230 is provided as an output of the carrier tracking loop to a subsequent QPSK detector stage, which is not illustrated in FIG. 2. In the case of QPSK reception, the output of matched filter pair 220 is provided directly to a subsequent QPSK detector stage as the output of the carrier tracking loop.

The symbol synchronous in-phase I2 and quadrature Q2 signal components, as provided directly from matched filter pair 220 for QPSK reception or from symbol shifter 230 for π/4QPSK reception as described previously, are also provided to amplitude normalization/fourth power circuit 240. The input signal components are firstly normalized to unity amplitude, thereby removing amplitude from the signal components. Subsequently the signal components are raised to the fourth power in order to remove QPSK modulation.

In greater detail, the input to amplitude normalization/fourth power circuit 240 is a sequence of complex (I and Q) soft decision values of arbitrary magnitude, any one value represented in simplified form as $$ae^{j\theta}=I+jQ \qquad (5).$$

The square of this value normalized to unity magnitude (amplitude) is $$(e^{j\theta})^2 = \frac{I^2 + j2IQ - Q^2}{I^2 + Q^2} = x + jy. \qquad (6)$$

The normalized fourth power is computed as the square of the normalized square $$(e^{j\theta})^4 = (x+jy)^2 \qquad (7).$$

It is to be understood that the square is normalized first before computing the fourth power. This is done for practical purposes to limit the required dynamic range (number of bits) of the calculations. It is to be further understood that amplitude normalization/fourth power circuit may be hardware implemented or alternatively software implemented as would be evident to one of ordinary skill. The in-phase I3 and quadrature Q3 signal components output from normalization/fourth power circuit 240 can be expressed as $$S_{MF}^4(n) = e^{j(8\pi\Delta fnT_s + 4\phi n)} e^{jnoise\ 4(n)} \qquad (5).$$

Generally, a received signal has a varying amplitude. Upon raising the baseband in-phase I2 and quadrature Q2 signal components to the fourth power, or equivalently squaring the signals twice in circuit 240, the dynamic range is greatly increased. However, increasing the dynamic range may result in overflow since a bit range of the corresponding receiver processing circuitry may be greatly exceeded. Since the carrier tracking loop is designed to adjust the frequency of the numerically controlled oscillator 210 to be the complex conjugate of the carrier frequency, and since the carrier tracking loop extracts a phase from the baseband in-phase I2 and quadrature Q2 signal components, the overflow problem is resolved by amplitude normalization/fourth power circuit 240 which limits the complex amplitude to unity amplitude, as will be described hereinafter.

Figure 3A:
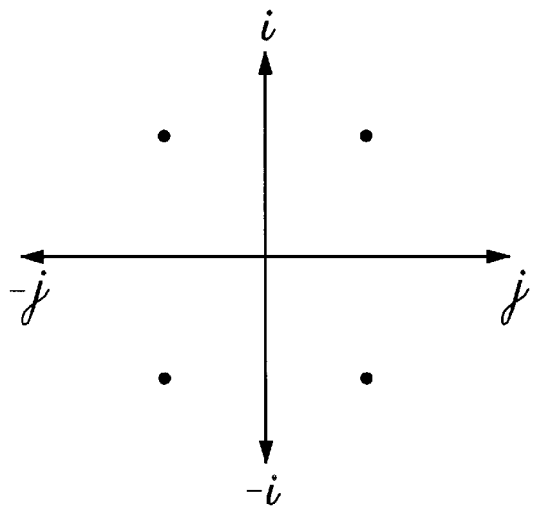
FIG. 3(a) illustrates a QPSK constellation with a signal represented as one of four possible data points.
Figure 3B:
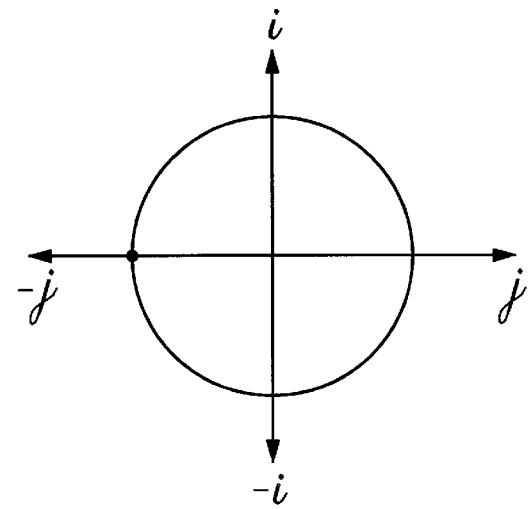
FIG. 3(b) illustrates the four possible data points of the QPSK constellation of FIG. 3(a) collapsed to a single point.

FIG. 3(a) illustrates a QPSK constellation wherein a signal can be represented as one of four possible data points in the constellation. The carrier component of the baseband in-phase I2 and quadrature Q2 signal components output matched filter 220 as represented by Equation (4) is assumed to be $e^{-j2\pi f_c}$ wherein the $d\pi/2$ exponent represents the data such that d=0, 1, 2 or 3. In the absence of noise, upon raising this signal to the fourth power, the exponent is multiplied by four such that the information part of the exponent becomes $2\pi d$, effectively wrapping or collapsing all four possible points into a single point, the single point as illustrated in FIG. 3(b) being on the unity circle as a result of normalization. Accordingly, normalization removes amplitude modulation and the fourth power operation removes phase information, so that the resultant components represent the carrier beat down to near DC.

Figure 4A:
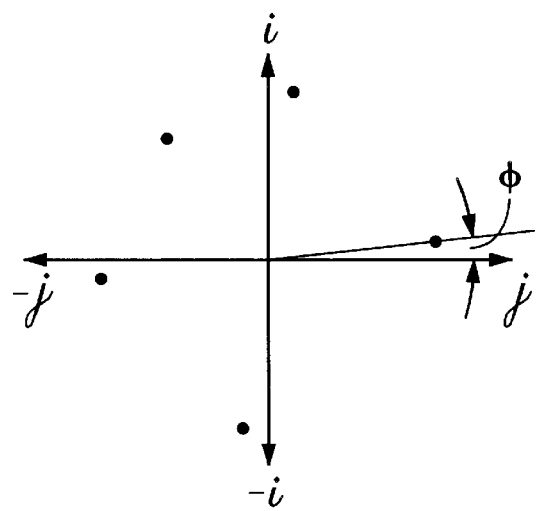
FIG. 4(a) illustrates a QPSK constellation wherein the four possible data points are offset from the zero angle by a small arbitrary phase angle.
Figure 4B:
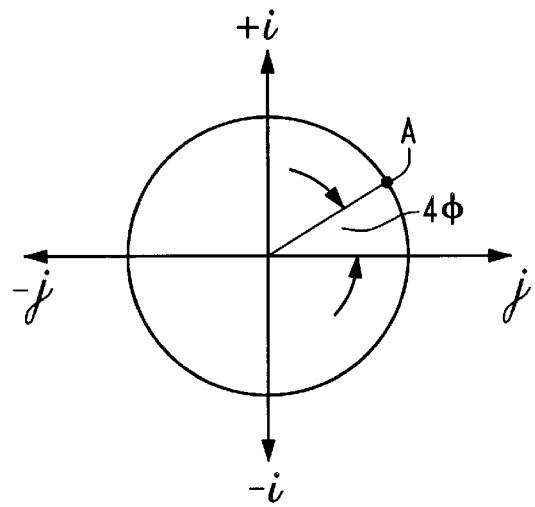
FIG. 4(b) illustrates the four possible data points of the QPSK constellation of FIG. 4(a) collapsed to a single point along the unity circle.

FIG. 4(a) illustrates a constellation wherein the four possible points on the constellation are offset from the zero angle by a small arbitrary phase angle φ. In absence of noise, the four points will collapse to a single point A on the unity circle as illustrated in FIG. 4(b). As a result of the fourth power operation, the phase angle is multiplied by four and is designated as 4φ.

The constellation as illustrated in FIG. 4(b) is gradually spinning at a rate of the frequency offset. For instance, a 1 Hz frequency offset spins the constellation at a rate of 1 time per second. In the absence of a frequency offset or noise, the constellation will not spin. Collapsed points for successive samples will move along the unity circle at a rate equivalent to the frequency offset in the absence of noise. The frequency offset between successive samples is determined in phase differential circuit 260, providing an error estimate for adjusting numerically controlled oscillator 210, as will be described hereinafter.

The complex, normalized fourth power output of circuit element 240 is provided to filter 250 which functions to increase the signal to noise ratio of the fourth power samples prior to differentiation in phase differential circuit 260. Generally, the filtering reduces errors due to ambiguity when the phase error of the input signal due to noise exceeds π/4 and increases loop performance. However, this filtering limits the capture range of the carrier tracking loop.

Filter 250 is activated only when the carrier tracking loop has determined that it is in a LOCK condition, since filtering limits the frequency reacquisition range of the carrier tracking loop. When LOCK=1, filter 250 averages the most recent eight fourth power samples; otherwise, filter 250 simply transfers the fourth power samples to phase differential circuit 260. Filter 250 selectively filters the incoming signal components as follows $$<S_{MF}^4(n)> = (1 - \text{LOCK})\, S_{MF}^4(n) + \frac{\text{LOCK}}{8} \sum_{K=0}^{7} S_{MF}^4(n-k). \qquad (9)$$

As is readily apparent, when the carrier tracking loop is in a LOCK condition whereby LOCK=1, the left-hand portion of Equation (9) drops out such that the filter averages the most recent eight fourth power samples.

The constellation of FIG. 4(b) with collapsed point A on the unity circle illustrates a best case without noise. In actuality, there is noise on each of the four possible points of the constellation. Each of the four points are therefore sampled a plurality of times so that the points on the constellation of FIG. 4(a) appear fuzzy, actually representing plural samples. The normalization/fourth power circuit 240 therefore scatters the four possible data points of the constellation of FIG. 4(a) on an arc of the unity circle illustrated in FIG. 4(b).

In greater detail, when the tracking mode is invoked (LOCK=1), if the signal to noise ratio is high and there is no frequency offset, then successive fourth power samples will lie at 0 angle with unity amplitude. Noise will cause a distribution of angles on an arc about 0 angle on the complex plane, wherein the amplitude is always unity. Filtering of this sequence of noisy samples will result in a sample mean of the sequence of eight samples. As the signal to noise ratio becomes very high, the individual samples converge to the mean. As the signal to noise ratio becomes lower, the samples become spaced further apart on the arc. As the signal to noise ratio diminishes, the amplitude of the mean of the eight samples on the arc becomes smaller than unity.

The filtered in-phase I4 and quadrature Q4 signal components output from filter 250 are provided to phase differential circuit 260. The phase difference of successive in-phase I4 and quadrature Q4 signal components output from filter 250 is representative of frequency offset or the amount in which the constellation spins between successive samples, and is determined by multiplying each sample by the complex conjugate of a previous sample.

The in-phase I4 signal component output filter 250 is input to multipliers 261 and 262 and delay element 263. The quadrature Q4 signal component output filter 250 is provided to multipliers 264 and 265 and delay element 266. The output of delay element 266 is provided as a second input to multipliers 262 and 265 and the output of delay element 263 is provided as a second input to multipliers 261 and 264. Adder 267 adds the outputs of multipliers 261 and 265 to provide a differential in-phase Idiff signal component. Subtractor 268 subtracts the output of multiplier 262 from the output of multiplier 264 to provide as an output a differential quadrature Qdiff signal component. The complex difference phasor output from phase differential circuit 260 can be represented as $$Idiff_n + jQdiff_n = <S_{MF}^4(n)><S_{MF}(n-1)> \cong e^{j8\pi\Delta fT_s} + noise8(n) \quad (10).$$

Estimation of the frequency offset by phase differential circuit 260 can be degraded by noise which scatters the points about the arc and also by a change in doppler, which may smear the points on the circle. For example, if a receiver in which the carrier tracking loop of FIG. 2 is embodied suddenly moves relative to a corresponding transmitter changing the distance therebetween, doppler will appear resulting in spinning of the constellation.

Since the amplitude of the complex output from phase differential circuit 260 is the product of the amplitudes of successive samples, then the amplitude of the complex output of phase differential circuit 260 is reduced as the signal to noise ratio is reduced. The differential in-phase Idiff signal component output from the phase differential circuit 260 is provided to amplifier 291, which along with adder 292 and amplifier 293, functions as an IIR filter or lossy integrator. The differential quadrature Qdiff signal component output from phase differential circuit 260 is provided to amplifier 294, which along with adder 295 and amplifier 296, functions as an IIR filter or lossy integrator. These filters provide additional smoothing of the differential output prior to signal to noise ratio estimation. The filtered differential in-phase Idiff and quadrature Qdiff signal components are provided to loop control circuit 270.

As will be described, the carrier tracking loop derives an error signal from the imaginary component of Equation (10). This error signal is processed by loop filtering consisting of constant gain $\alpha$, gain $\beta$, the perfect integrator comprising adder 298 and delay 299 and additional gain control (nominally 1), which will be described hereinafter. It is to be understood that the values of $\alpha$, $\alpha 1$, $\beta 1$ and the various other parameters and thresholds of the carrier tracking loop of FIG. 2 are chosen to establish the best compromise between response time and tracking accuracy while ensuring closed-loop stability.

Figure 5:
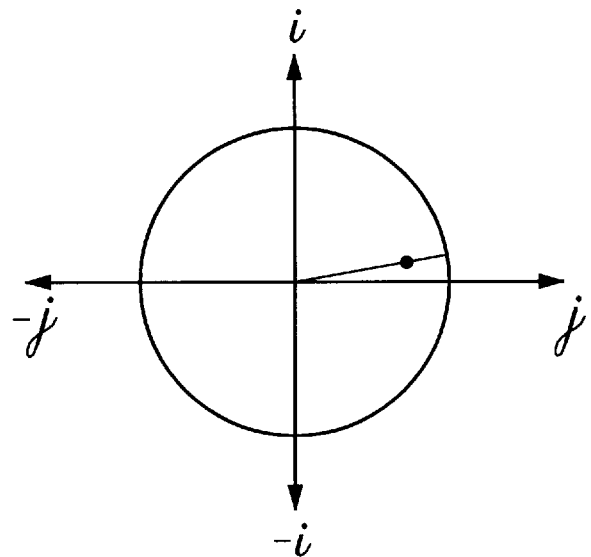
FIG. 5 illustrates a filtered estimated error signal on a QPSK constellation within the unity circle.

The error signal and control of the carrier tracking loop will now be described in connection with loop control circuit 270. Firstly, the filtered differential Idiff and Qdiff signal components will be described with reference to the constellation illustrated in FIG. 5. The differential signal component designated by the point in the constellation illustrated in FIG. 5 is a filtered phasor which represents an estimate of the frequency offset between successive samples. The phasor angle represents constellation shift in degrees between successive samples and is directly proportional to the frequency offset. A positive phasor angle corresponds to a positive frequency offset while a negative phasor angle corresponds to a negative frequency offset.

As described previously, filter 250 places the averaged sample point within the unity circle along the frequency offset angle of FIG. 4(b) for instance. As the amount of noise increases, the averaged sample point approaches the origin along the frequency offset angle. Also, the length of the filtered vector in the constellation illustrated in FIG. 5 is monotonically related to the signal to noise ratio of the input signal. The phasor length of a noisy signal will be smaller and will approach the origin. If the phasor length is very small, or within a certain distance of the origin, the signal to noise ratio of the input signal may be considered too low and the carrier tracking loop can subsequently be instructed to enter a flywheel mode, as will be described hereinafter. In this manner, the carrier tracking loop can be prevented from reacting to noise.

Figure 6:
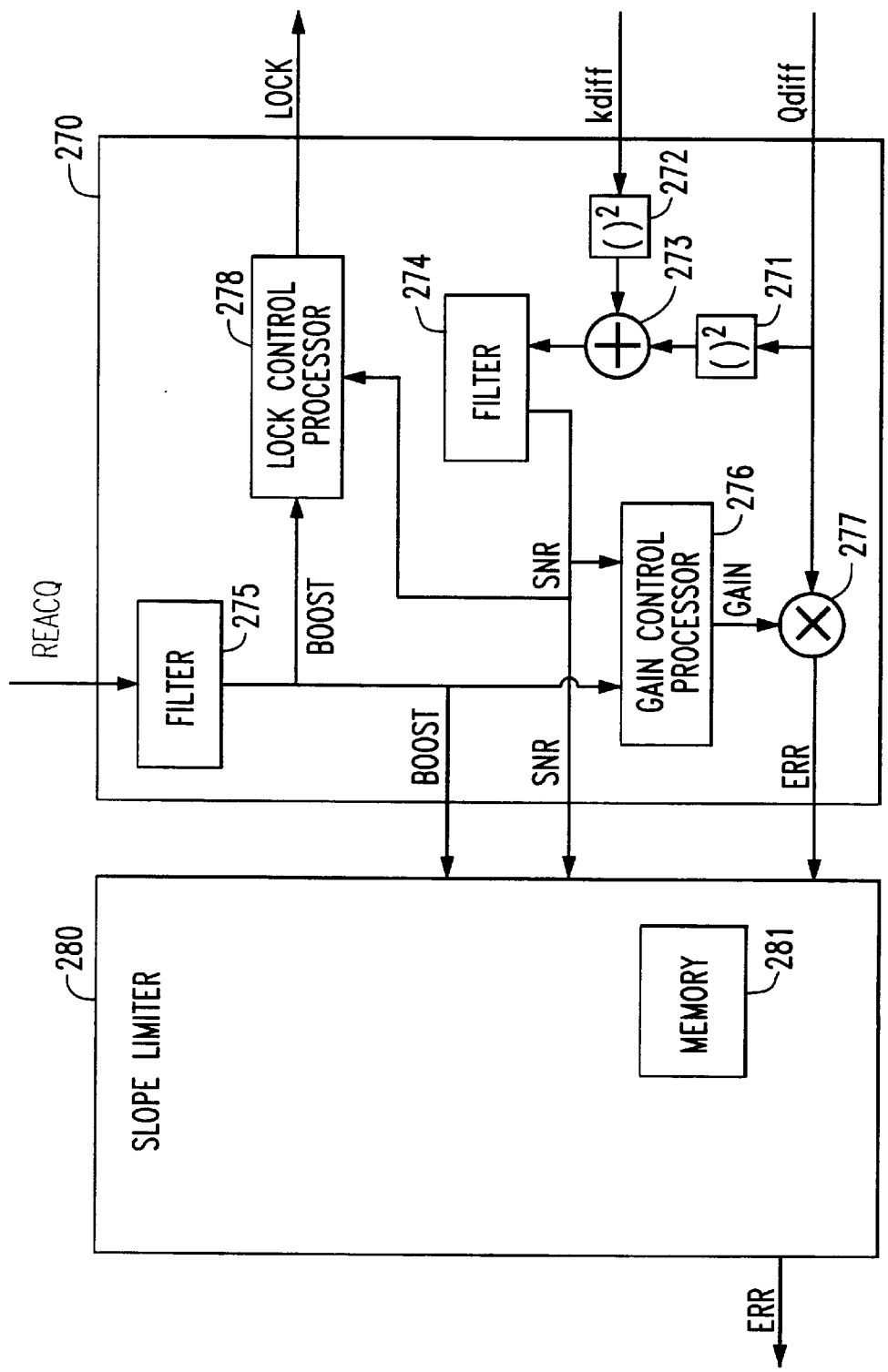
FIG. 6 illustrates a simplified block diagram of the loop control circuit of FIG. 2 including the corresponding signals output therefrom to the slope limiter.

Loop control circuit 270 is illustrated in greater detail in FIG. 6 along with slope limiter 280. Although loop control circuit 270 will be described with reference to FIG. 6 as including discrete circuit components, it is to be understood that loop control circuit 270 may be software implemented.

Loop control circuit 270 improves acquisition and tracking performance of the carrier tracking loop under dynamic conditions. Conflicting requirements of smooth accurate frequency tracking, fast reacquisition, and doppler tracking over a wide dynamic range (Eb/No) are not necessarily achievable with conventional carrier tracking techniques. However, in the carrier tracking loop of a preferred embodiment of the present application, these conflicting requirements are realized by varying the loop parameters as a function of mode (i.e. flywheel, tracking or reacquisition). Accordingly, a key feature of the carrier tracking loop is determination of the active state of the carrier tracking loop as being in a flywheel, tracking or reacquisition mode. This determination enables appropriate setting of the GAIN (0 or BOOST+1) and the LOCK signal.

In order to determine the state of the carrier tracking loop, loop control circuit 270 estimates the signal to noise ratio (Eb/No) of the filtered differential signal components. This is accomplished by computing the sum of the squares of the complex filtered differential signal components. The filtered differential quadrature Qdiff signal component is provided to squarer 271 and the filtered differential in-phase Idiff signal component is provided to squarer 272. The outputs of squarers 271 and 272 are provided to adder 273 which adds the squared signals and outputs a smooth signal to noise ratio estimate to filter 274. In a preferred embodiment, filter 274 may be an IIR filter or two-stage lossy integrator having the following filter expression $$y(n) = [4032y(n-1) - 3969y(n-2) + x(n)]/4096 \quad (11).$$

It is to be understood that the filter expression of Equation (11) and the corresponding time constants are given by way of illustration only and are not to be considered limiting. Filter 274 filters the estimated signal to noise ratio and provides the filtered estimate as an SNR output signal.

An externally provided reacquisition signal is provided to filter 275 of loop control circuit 270, as illustrated in FIG. 6, to inform the loop control circuit that reacquisition is necessary. The reacquisition signal is preferably a digital impulse and may be provided from matched filter pair 220 or by peripheral circuitry, as would be understood by one of ordinary skill. In a preferred embodiment, filter 275 may be an IIR filter or two-stage lossy filter having the following filter expression $$y(n)=[4032\ y(n-1)-3969\ y(n-2)]/4096 \qquad (12).$$

It is to be understood that the filter expression of Equation (12) and the corresponding filter coefficients are given by way of illustration and are not to be considered as limiting. In a further preferred embodiment, filter 275 may be initialized to y(n)=0.125 and y(n-1)=2 for example. It is to be further understood that filters 274 and 275 may be software implemented.

Filter 275 outputs a digital impulse as a BOOST output signal upon receipt of the reacquisition signal. The BOOST signal rises quickly and then decays in a predetermined manner typical of an IIR response, in accordance with the filter expression of Equation (12). The purpose of the BOOST signal is to increase the loop GAIN and to disable the LOCK signal to LOCK=0 when the carrier tracking loop is commanded to reacquire. The BOOST signal is also used to provide a boolean function for detecting reacquisition mode whereby determination is made based on whether the BOOST signal is above a predetermined threshold.

The gain of the carrier tracking loop is controlled by gain control processor 276 based on the BOOST signal and SNR estimate. Gain control processor 276 outputs a GAIN signal to multiplier 277 which adjusts the gain of the filtered differential quadrature Qdiff signal component and outputs the estimated error signal ERR. The GAIN signal is nominally set to BOOST+1, which is usually near unity (independent of α, α1 and β1).

Gain control processor 276 functions to determine when the BOOST signal is active. The BOOST signal is considered active when BOOST is greater than a predetermined threshold THRES (i.e. BOOST>THRES). As described previously, the BOOST signal rises quickly and then decays. Accordingly, when the BOOST signal is greater than THRES, the carrier tracking loop is determined as being in the reacquisition mode. Gain control processor 276 thus determines that the carrier tracking loop should reacquire by setting GAIN=BOOST+1. As the BOOST impulse response decays, the GAIN signal approaches unity and the carrier tracking loop is allowed to track with the error signal ERR. As is clearly evident, the gain of the carrier tracking loop is increased at the onset of reacquisition and thereafter decreases proportionally to the BOOST signal.

Gain control circuit 276 also functions to determine if the SNR estimate is greater than a predetermined minimum threshold MIN (i.e. SNR>MIN). This determination by gain control processor 276 provides an indication that the signal to noise ratio of the filtered differential signal components output from phase differential circuit 276 is acceptable when the carrier tracking loop is no longer in a reacquisition mode. In this instance, gain control processor 276 maintains GAIN=BOOST+1 such that GAIN changes proportionally to the BOOST signal when SNR>MIN and the carrier tracking loop is no longer in the reacquisition mode.

Lastly, gain control processor 276 functions to set GAIN=0 if it is determined that SNR<MIN or BOOST<THRES. This would correspond to a flywheel condition wherein the carrier tracking loop is not a reacquisition mode as indicated by the BOOST signal and the SNR estimate of the complex filtered differential signal is minimal. In the flywheel mode, numerically controlled oscillator 210 is prevented from responding to an overly noisy error signal ERR since GAIN=0.

It is to be understood that the previously described functions of gain control processor 276 may be carried out by a microprocessor under software control, as would be well within the scope of ordinary skill. In the alternative, gain control circuit 276 may be comprised of discrete circuit components such as comparators, adders or the like. Such variations are to be considered as within the scope of the present invention.

The loop control circuit functions as follows to provide the LOCK signal. The BOOST signal from filter 275 and the SNR estimate from filter 274 are input to lock control processor 278. As described previously, the lock signal provided to filter 250 is set to 1 when the carrier tracking loop is in a tracking mode and is set to zero otherwise. Lock control processor 278 establishes that the carrier tracking loop is not in the reacquisition mode when it is determined that the BOOST signal is less than THRES. Lock control processor 278 establishes that the carrier tracking loop is not in a flywheel mode when the SNR estimate is greater than MIN. Accordingly, lock control processor 278 sets LOCK to 1 when the carrier tracking loop is tracking, or when it has been established that the carrier tracking loop is not in a reacquisition mode and is not in a flywheel mode. Filter 250 averages the most recent eight fourth power samples when LOCK=1 as described previously.

Filter 250 is activated only when LOCK=1. Since the filter does not enhance carrier tracking loop performance in reacquisition or flywheel modes. In fact, the filter hinders performance in the reacquisition mode when the frequency is changing rapidly. This is because the eight fourth power samples are spread across a large arc on the complex plane. The length of the arc is proportional to the frequency change. When the length of the arc becomes sufficiently large, for example π radians, the error signal from phase differential circuit 260 diminishes rapidly even when the actual signal to noise ratio is high. This would have the undesirable effect of decreasing loop gain during reacquisition when the loop gain should actually be increased.

The BOOST signal, SNR estimate and the estimated error signal ERR are provided from loop control circuit 270 to slope limiter 280. The purpose of slope limiter 280 is to reduce unintentional phase noise in the error signal ERR attributed to the carrier tracking loop. Generally, noise in the incoming signal results in the introduction of noise in the error signal ERR from the carrier tracking loop. This error signal noise attributed to the carrier tracking loop modulates numerically controlled oscillator 210 as phase noise. Because of the particular nonlinearities in the carrier tracking loop, the error signal noise tends to be peaky, not gaussian. The noise becomes more severe as the signal to noise ratio decreases at the input of the carrier tracking loop.

Although reduction of loop bandwidth may serve to reduce the error signal noise, the carrier tracking loop response time to a frequency transient during reacquisition, for example, would suffer as a result. Instead, slope limiter 280 of a preferred embodiment of the present invention smooths the peaks in the error signal to reduce carrier tracking loop phase noise while retaining the effective integrated values of the clipped or excess portion of the error signal. This excess or clipped portion is added back to the error signal when it falls below the clip value. This effectively eliminates any additional error or bias which might be caused by limiting, especially in the presence of doppler variations. Accordingly, all of the integrated error information is preserved in memory 281 of slope limiter 280 while the peaks are made smooth to reduce carrier tracking loop phase noise and maintain enhanced loop response time.

Figure 7:
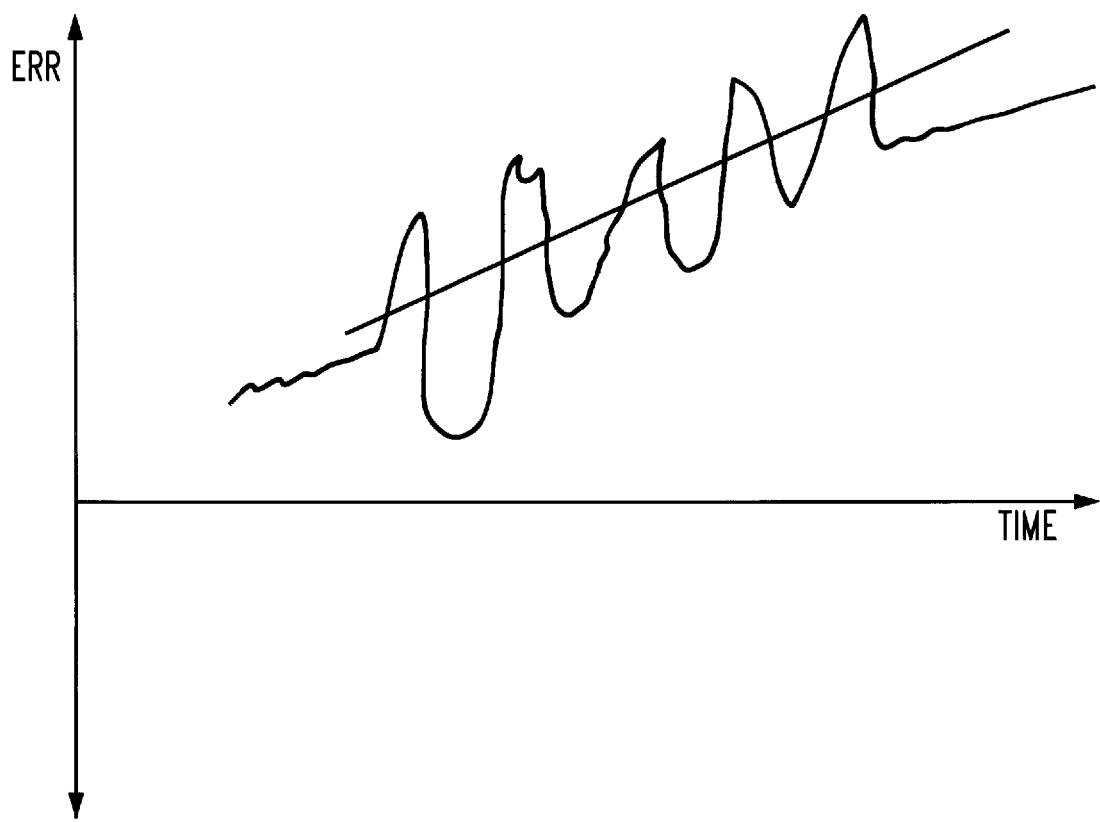
FIG. 7 illustrates the error signal estimate with straight line approximation.

FIG. 7 illustrates error signal estimate ERR which is provided to slope limiter 280 from loop control circuit 270. The error signal as illustrated is very peaky. A straight line approximation is superimposed on the error signal for the sake of description and since typically the average of the slope will approximate this straight line. As described previously, it is undesirable to permit spikes in the error signal estimate ERR to drive numerically controlled oscillator 210, since this would effectively introduce noise into the down converted signal output complex mixer 200. Slope limiter circuit 280 therefore limits how fast the error signal estimate ERR can change, such that the slope rate of the error signal estimate is limited and approaches the straight line approximation. Slope limiter 280 in this way prevents numerically controlled oscillator 210 from responding to noisy spikes in the error signal estimate. Slope limiter 280 functions to respond to all of the information of the error signal estimate by integrating the information that is clipped and subsequently adding the clipped excess back in when the error signal estimate falls below the straight line approximation. The slope limiter therefore tends to put a straighter, smoother line through the noisy spiky error signal estimate.

Slope limiter 280 firstly functions to determine when BOOST is less than 0.01 and SNR is less than 0.05 (about 6 db Eb/No). Accordingly, Equation (13) as follows is invoked when the carrier tracking loop is not in a reacquisition mode and the signal to noise ratio is low:

$$SUM(n)=ERR(n)+EXCESS(n) \qquad (13).$$

In Equation (13), ERR(n) represents the error signal estimate output from loop control circuit 270 and EXCESS(n) represents that portion of the error signal estimate which is determined to be the excess or clipped portion. In accordance with Equation (13), at each symbol timing, slope limiter 280 adds an earlier determined stored value EXCESS (n) to the current value ERR(n) to provide a current value of SUM(n).

In greater detail, in a first operational range, slope limiter 280 determines a value of the error signal ERR(n) at a given time n. At time n, the value SUM(n) will be equivalent the value ERR(n) at time n and an earlier stored value of EXCESS(n). If it is determined by slope limiter 280 that the value SUM(n) is greater than 0.008, slope limiter 280 sets the value ERR(n) equal to 0.008, thus limiting the current value of the error signal estimate ERR(n), clipping the excess portion thereof.

Slope limiter 280 keeps account of the clipped or excess portion at time n whereby the value EXCESS(n+1) for the subsequent symbol time is determined as $$EXCESS(n+1)=[SUM(n)-0.008]\ 0.999 \qquad (14).$$

This value EXCESS(n+1) for a subsequent symbol time is stored in memory 281 of slope limiter 280 and is used to determine the value SUM(n+1) of the subsequent symbol time. Accordingly, the excess or clipped portion is accounted for and the information is not disregarded.

In a second operational range, when slope limiter 280 determines that SUM(n) is less than −0.008, the value ERR(n) is set to −0.008. The value EXCESS(n+1) of a subsequent symbol time is set in accordance with Equation (13) above.

Lastly, in a third operational range, when slope limiter 280 determines that ERR(n)=SUM(n), the value EXCESS(n+1) for the subsequent symbol time is set equal to 0. Slope limiter 280 therefore limits the phase noise by clipping the value SUM(n) to ±0.008. It is to be understood that these parameters have been empirically derived in the above example and are given by way of illustration only, and thus are not to be considered limiting.

The slope limited error signal ERR output from slope limiter 280 is provided to amplifier 297 and subsequently to the perfect integrator comprising adder 298 and delay element 299. As described previously, the output of the integrator comprising adder 298 and delay 299 is provided to control the frequency of numerically controlled oscillator 210. As also noted previously, the values of $\alpha$, $\alpha 1$, $\beta 1$ and the various parameters and thresholds are chosen to establish the best compromise between response time and tracking accuracy while ensuring closed loop stability. In a preferred embodiment, the integrator comprising adder 298 and delay 299 may be set with an initial frequency estimate to improve carrier tracking loop performance.

It is to be understood that lock control processor 278 may be a software controlled microprocessor, or in the alternative discrete hardware components such as comparators, adders or the like. Also, the entire loop control circuit 270 including the functions provided by the gain control processor 276 and lock control processor 278 may be software implemented. It is further understood that the LOCK signal may be made available for use external to the carrier tracking loop.

Accordingly, a preferred embodiment of the present invention having an amplitude normalization/fourth power function and control of carrier tracking loop gain enables improved carrier tracking loop performance with arbitrary gain or signal to noise ratio and enhanced reacquisition speed when the modem experiences a fading or intermittent channel. The slope limiting function reduces unintentional phase noise introduced by the carrier tracking loop while retaining the response time characteristics.

It is to be understood that the invention as described above may be varied in many ways. For instance, the various circuit elements as described can be realized in a software implementation. Also, the circuit elements described can be replaced with various circuit elements which perform similar functions. Such variations are not to be regarded as a departure from the spirit and scope of the invention, and all such modifications as would be obvious to one skilled in the art are intended to be included within the scope of the following claims.

What is claimed is:

1. A carrier tracking loop comprising:
    mixing means for mixing a received signal with a local oscillator signal to translate the received signal to a near baseband signal;
    symbol synchronization means, coupled to said mixing means, for sampling the near baseband signal at an optimum symbol timing and outputting symbol samples;
    normalization means, coupled to said symbol synchronization means, for normalizing an amplitude of the symbol samples and removing phase modulation of the symbol samples to output normalized symbol samples;

filter means, coupled to said normalization means, for selectively increasing the signal to noise ratio of the normalized symbol samples in accordance with a lock signal;

frequency discriminating means, coupled to said filter means, for estimating a frequency offset between successive filtered symbol samples and outputting an error signal indicative thereof;

loop control means, coupled to said frequency discriminating means and an externally provided reacquisition initiation signal, for a) determining a signal to noise ratio of the filtered symbol samples in accordance with the error signal and b) generating the lock signal and adjusting the gain of the carrier tracking loop in accordance with the determined signal to noise ratio and the reacquisition initiation signal; and oscillator means, operatively coupled to said loop control means, for generating the local oscillator signal in accordance with the gain adjusted error signal.

2. The carrier tracking loop of claim 1, wherein the near baseband signal and the symbol samples include respective in-phase signal components and quadrature signal components, said frequency discriminating means comprising:

phase differentiating means for determining a phase difference between successive filtered symbol samples and for outputting respective in-phase and quadrature differential signal components, wherein the error signal is the quadrature differential signal component.

3. The carrier tracking loop of claim 2, wherein said loop control means comprises:

first squaring means, coupled to said frequency discriminating means, for squaring the quadrature differential signal component to output a first squared signal;

second squaring means, coupled to said frequency discriminating means, for squaring the in-phase differential signal component to output a second squared signal; and adder means for adding the first and second squared signals to output an added signal which represents the determined signal to noise ratio.

4. The carrier tracking loop of claim 3, wherein said loop control means further comprises:

first means, coupled to the reacquisition initiation signal, for outputting a boost signal which decays gradually over a predetermined duration; and lock control means, coupled to said first means and said adder means, for generating the lock signal such that said filter means increases the signal to noise ratio of the normalized symbol samples when the determined signal to noise ratio is greater than a first threshold and the boost signal is less than a second threshold.

5. The carrier tracking loop of claim 4, wherein said loop control means further comprises:

gain control means, coupled to said first means and said adder means, for generating a gain signal; and multiplication means, coupled to said frequency discriminating means, for multiplying the quadrature differential signal component by the gain signal, the gain signal decreasing from an initial increased value directly proportionally to the boost signal when the determined signal to noise ratio is greater than the first threshold or when the boost signal is greater than the second threshold and the gain signal being equal to zero otherwise.

6. The carrier tracking loop of claim 4, wherein the reacquisition initiation signal is a digital impulse and said first means comprises a two-stage lossy filter.

7. The carrier tracking loop of claim 1, wherein said loop control means increases the gain of the carrier tracking loop upon receipt of the reacquisition initiation signal or when the determined signal to noise ratio is greater than a predetermined minimum threshold.

8. The carrier tracking loop of claim 7, wherein the gain decreases from an initial increased value.

9. The carrier tracking loop of claim 1, wherein said filter means averages a predetermined number of successive normalized symbol samples upon receipt of the lock signal to provide a reduced noise normalized symbol sample.

10. The carrier tracking loop of claim 9, wherein the predetermined number is eight.

11. The carrier tracking loop of claim 1, further comprising:

slope limiting means, coupled to said loop control means, for limiting a slope of the gain adjusted error signal and for outputting the slope limited error signal to said oscillator means.

12. The carrier tracking loop of claim 1, wherein said loop control means generates the lock signal such that said filter means increases the signal to noise ratio of the normalized symbol samples only when the carrier tracking loop is in a frequency locked state.

13. The carrier tracking loop of claim 1, wherein said oscillator means comprises a numerically controlled oscillator.

14. The carrier tracking loop of claim 1, wherein said symbol synchronization means comprises a pair of matched filter means.

15. A method of tracking a carrier signal in a carrier tracking loop comprising:

a) mixing a received signal with a local oscillator signal to translate the received signal to a near baseband signal;

b) sampling the near baseband signal at an optimum symbol timing to generate symbol samples;

c) normalizing an amplitude of the symbol samples and removing phase modulation of the symbol samples to provide normalized symbol samples;

d) filtering the normalized symbol samples to selectively increase the signal to noise ratio of the normalized symbol samples in accordance with a lock signal;

e) estimating a frequency offset between successive filtered symbol samples and providing an error signal indicative thereof;

f) determining a signal to noise ratio of the filtered symbol samples in accordance with the error signal;

g) generating the lock signal and adjusting the gain of the carrier tracking loop in accordance with the determined signal to noise ratio and an externally applied reacquisition initiation signal; and h) generating the local oscillator signal in accordance with the gain adjusted error signal.

16. The method of tracking of claim 15, wherein the near baseband signal and the symbol samples include respective in-phase signal components and quadrature signal components, said step e) comprising:

determining a phase difference between successive filtered symbol samples to provide respective in-phase and quadrature differential signal components, wherein the error signal is the quadrature differential signal component.

17. The method of tracking of claim 16, wherein said step f) comprises:
   f1) squaring the quadrature differential signal component to provide a first squared signal;
   f2) squaring the in-phase differential signal component to provide a second squared signal; and
   f3) adding the first and second squared signals to provide an added signal which represents the determined signal to noise ratio.

18. The method of tracking of claim 17, wherein said step g) comprises:
   g1) generating a boost signal which decays gradually over a predetermined duration; and
   g2) generating the lock signal such that the signal to noise ratio of the normalized symbol samples is increased in said step d) when the determined signal to noise ratio is greater than a first threshold and the boost signal is less than a second threshold.

19. The method of tracking of claim 18, wherein said step g) further comprises:
   g3) generating a gain signal in accordance with the boost signal and the added signal; and
   g4) multiplying the quadrature differential signal component by the gain signal,
   the gain signal decreasing from an initial increased value directly proportionally to the boost signal when the determined signal to noise ratio is greater than the first threshold or the boost signal is greater than the second threshold and the gain signal being equal to zero otherwise.

20. The method of tracking of claim 15, wherein said step g) comprises increasing the gain of the carrier tracking loop upon receipt of the reacquisition initiation signal or when the determined signal to noise ratio is greater than a predetermined minimum threshold.

21. The method of tracking of claim 20, wherein the gain decreases from an initial increased value.

22. The method of tracking of claim 15, wherein said step d) comprises averaging a predetermined number of successive normalized symbol samples upon receipt of the lock signal to provide a reduced noise normalized symbol sample.

23. The method of tracking of claim 22, wherein the predetermined number is eight.

24. The method of tracking of claim 15, further comprising:
   i) limiting a slope of the gain adjusted error signal to provide a slope limited error signal for generating the local oscillator signal in said step h).

25. The method of tracking of claim 15, wherein said step g) comprises generating the lock signal such that the signal to noise ratio of the normalized symbol samples is increased in said step d) only when the carrier tracking loop is in a frequency locked state.

26. A carrier tracking loop comprising:
   mixing means for mixing a received signal with a local oscillator signal to translate the received signal to a near baseband signal;
   oscillator means for generating the local oscillator signal in accordance with an error signal;
   symbol synchronization means, coupled to said mixing means, for sampling the near baseband signal at an optimum symbol timing and outputting symbol samples; and
   loop control means, coupled to said symbol synchronization means, for generating the error signal in accordance with the symbol samples, determining a signal to noise ratio of the symbol samples and adjusting a gain of the carrier tracking loop in accordance with the determined signal to noise ratio, wherein said loop control means comprises slope limiting means for limiting a slope of the error signal.

27. A method of tracking a carrier signal in a carrier tracking loop comprising:
   a) generating a local oscillator signal in accordance with an error signal;
   b) mixing a received signal with the local oscillator signal to translate the received signal to a near baseband signal;
   c) sampling the near baseband signal at an optimum symbol timing to provide symbol samples;
   d) generating the error signal in accordance with the symbol samples;
   e) determining a signal to noise ratio of the symbol samples;
   f) adjusting a gain of the carrier tracking loop in accordance with the signal to noise ratio determined in said step e); and
   g) limiting a slope of the error signal.

* * * * *